Jan. 18, 1949.   R. G. SHANKWEILER ET AL   2,459,461
FREQUENCY MODULATION DISTANCE INDICATOR
Filed June 23, 1945

INVENTORS
Ray G. Shankweiler
& Daniel Blitz
BY
ATTORNEY

Patented Jan. 18, 1949

2,459,461

UNITED STATES PATENT OFFICE 2,459,461

FREQUENCY MODULATION DISTANCE INDICATOR

Ray G. Shankweiler, Cranbury, and Daniel Blitz, Princeton, N. J., assignors to Radio Corporation of America, a corporation of Delaware Application June 23, 1945, Serial No. 601,128

3 Claims. (Cl. 343—14)

This invention relates to distance measuring devices such as absolute altimeters, and more particularly to improvements in systems which operate by reflection of frequency modulated signals.

Frequency modulation altimeters are well known, being described in Bentley Patent 2,011,302 and in Espenschied Patent 2,045,071. In these systems a frequency modulated signal is radiated to the surface or object whose distance is to be measured. In a receiver located near the point of radiation, the reflected signal is picked up and mixed or heterodyned with some of the frequency modulated signal received directly from the transmitter. The average frequency of the resulting beat signal is determined by the time required for the radiated signal to reach the reflecting object and return to the receiver, and is directly proportion to the distance. The beat signal is applied to a frequency responsive indicator, calibrated in units of distance.

The indicator usually includes a cycle counter circuit and a direct current meter, but may comprise a frequency responsive servo system such as that shown in Guanella Patent 2,268,587.

In any case, the indicator system will exhibit a substantially unavoidable time lag owing to mechanical and electrical damping of the system which is necessary to prevent unsteady or erratic indication.

This time lag causes no difficulty as long as the distance being measured is constant, or changing slowly. However, when the distance is increasing, or decreasing, the indication will differ from the true distance by an amount $vt$, where $t$ is the time lag and $v$ is the rate of change of distance. Under conditions of rapidly changing distance, this error may become undesirably large.

Reference is made to copending application Serial Number 596,692, filed May 30, 1945 by Daniel Blitz and entitled Radio devices, which describes and claims methods of and means for compensating said error.

The object of the present invention is to provide improved methods of and means for compensating indicator time lags in systems of the described type.

Figure 1:
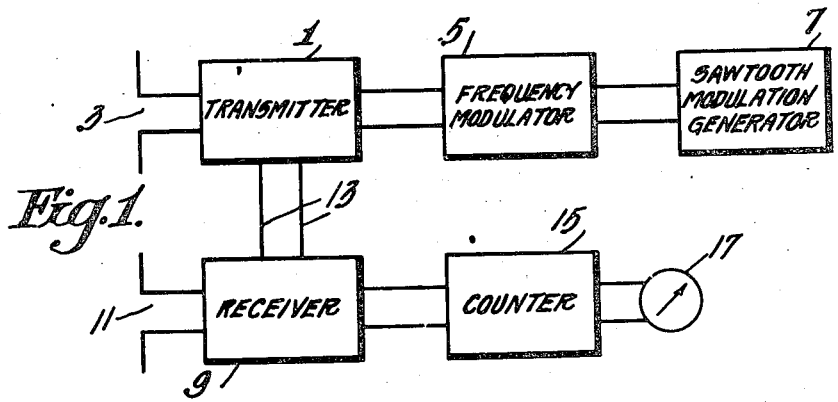
Figure 2:
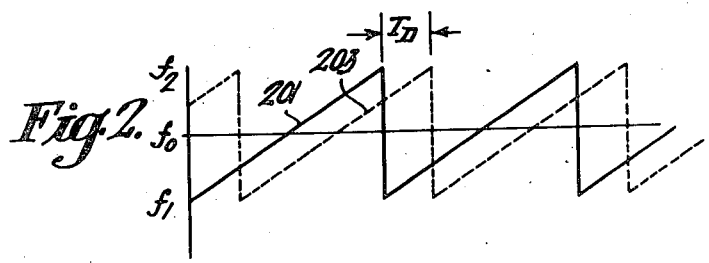
Figure 3:
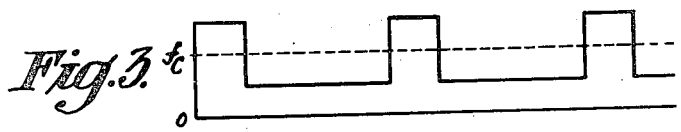
Figure 4:
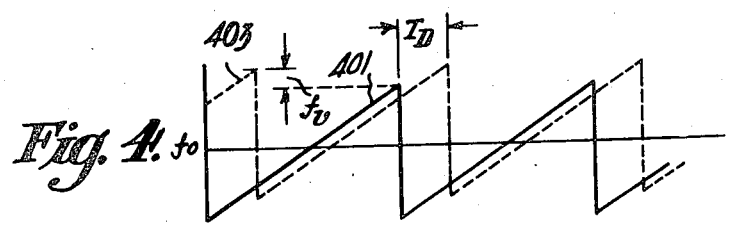
Figure 5:
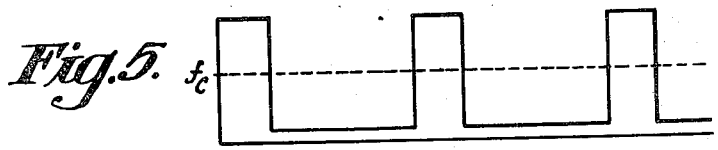

The invention will be described with reference to the accompanying drawing, in which:

Figure 1 is a schematic block diagram of a frequency modulation distance measuring system embodying the present invention, Figure 2 is a graph showing the frequencies of signals transmitted and received in the operation of the system of Figure 1 when the distance being measured remains constant, Figure 3 is a graph of the frequency of the beat signal derived from the signals of Figure 2, Figure 4 is a graph showing the frequencies of signals transmitted and received in the operation of the system of Figure 1 when the distance being measured is decreasing, and Figure 5 is a graph of the frequency of the beat signal derived from the signals of Figure 4.

Referring to Figure 1, a radio transmitter 1 is provided with an antenna 3 and a frequency modulator 5. The modulator 5 may be a reactance tube circuit, an electrically driven vibratory variable capacitor such as that described in application Serial No. 471,003, filed January 1, 1943 by Sydney V. Perry and entitled Capacity modulator unit, or any known means for cyclically varying the frequency of the transmitter 1 in a predetermined manner as described hereinafter.

In the present illustration, the modulator 5 is of the type which varies tuning in accordance with an applied voltage. The modulator 5 is connected to a modulation generator 7 designed to produce an output of sawtooth wave form, cyclically increasing linearly at a relatively low rate and decreasing at a much higher rate.

A receiver 9, tuned to respond to signals produced by the transmitter 1, is provided with an antenna 11 and is also coupled directly to the transmitter 1 by a line 13. The output circuit of the receiver 9 is coupled to a frequency responsive indicator system including a cycle counter circuit 15 and a D.-C. meter 17. In accordance with usual design practice, the audio frequency response characteristic of the receiver 9 is made to cut off sharply at a relatively high audio frequency, denoted hereinafter as $f_c$. This is done to prevent spurious high frequency signals such as noise from operating the indicator, and serves an additional purpose in the practice of the present invention. The receiver 9 may also include an amplitude limiter as is common in systems of the described type.

The adjustment and operation of the described system is as follows: The transmitter 1 produces a high frequency signal which is varied cyclically in frequency by the modulator 5 and modulation generator 7, in the manner illustrated by the solid line 201 of Figure 2. The average frequency is $f_0$ and the instantaneous frequency increases linearly from a lower value $f_1$ to an upper value $f_2$, then decreases substantially instantaneously from $f_2$ to $f_1$. This is repeated at the rate of $f_m$ times per second, where $f_m$ is the frequency of the modulation generator 7.

A small part of the output of the transmitter 1 is applied directly to the receiver 9 through the line 13. The major portion of the transmitter output is radiated by the antenna 3. Some of the radiated energy strike the object (not shown) whose distance is to be determined, and is reflected back to the receiver antenna 11. The time $T_D$ required for a signal to go from the antenna 3 to the reflecting object and back to the antenna 11 is $$\frac{2D}{c}$$

where $D$ is the distance of the object from the antennas 3 and 11, and $c$ is the velocity of wave propagation.

During a period of length $T_D$, the transmitter frequency changes by an amount $$T_D \frac{df}{dt}$$

where $$\frac{df}{dt}$$

is the rate of change of transmitter frequency and is equal to $$(f_2 - f_1) f_m$$

Thus, as long as the distance remains constant and the transmitter frequency continues to increase, the frequency of the received signal differs from that of the transmitted signal by the amount $$\frac{2D}{c}(f_2 - f_1) f_m$$

The frequency of the received signal varies cyclically as shown by the dash line 203 in Figure 2.

The direct and reflected signals are applied from the antenna 11 and the line 13 respectively to the receiver 9, where they are combined and detected to produce a beat signal of a frequency equal to the difference in frequency of the two signals. The frequency of the beat signal is illustrated by the graph of Figure 3, and is proportional to the distance except during the periods when a cycle of the transmitted frequency variation overlaps a different cycle of frequency variation of the reflected signal. It is evident that these periods are of length $T_D$. In a typical system the maximum value of $T_D$ is of the order of ten microseconds, while the length of each modulation cycle, $$\frac{1}{f_m}$$

is of the order of .01 second.

During the overlap periods, the transmitted frequency is near its minimum value $f_1$, and the received frequency is near its maximum value $f_2$. The beat frequency is therefore only slightly less than $f_2 - f_1$. This difference is ordinarily of the order of several megacycles, and is very much higher than the high frequency cutoff $f_c$ of the receiver, or the beat frequency corresponding to the maximum range of the equipment. Thus the output of the receiver 9 comprises only a voltage of the beat frequency proportional to distance, interrupted at intervals of $$\frac{1}{f_m}$$

or periods of $T_D$.

The counter 15 provides an output related in magnitude to the average frequency of the applied beat signal, which is substantially proportional to the distance $D$. This output deflects the meter 17 in accordance with the distance $D$.

$$I = k \frac{2D}{c}(f_2 - f_1) f_m$$

where $I$ is the indicated distance, and $k$ is a coefficient including the sensitivities of the counter circuit 15 and the meter 17.

Throughout the above description it has been assumed that $D$ remains substantially constant, and consequently that the frequency of the input to the indicator system is constant. Now suppose that the input to the indicator is changing in frequency, at a rate which corresponds to an increase in distance of $V$ feet/sec. The distance indication $I$ will increase correspondingly, but the response to each increment in frequency will be delayed by a time $t_L$. As long as the frequency continues to change, the indication will differ from that corresponding to the actual frequency by the amount $$k \frac{2V}{c}(f_2 - f_1) f_m t_L$$

This effect tends to make the indicator read high when the distance is decreasing, and low when the distance is increasing.

When the distance $D$ is changing at a rate $V$, Doppler effect causes a change in the frequency of the reflected signal, of $$\frac{2V f_0}{c}$$

cycles per second. This Doppler shift increases the frequency when the distance is decreasing, and vice versa.

Referring to Figure 4, the frequency of the radiated signal is shown by the solid line 401, similar to the line 201 of Figure 2. The distance is decreasing at the rate $V$. The frequency of the received reflection signal is shown by the dash line 403. The variations in frequency of the received signal are delayed with respect to those of the transmitted signal by the time $T_D$, as under the conditions of Figure 2. However, the instantaneous frequency of the received signal is greater than under the conditions of Figure 2, by the amount $$\frac{2V f_0}{c}$$

The resulting beat frequency is lower, for a given distance, than it would be if the distance were not decreasing. Thus the Doppler effect tends to make the indicator read low when the distance is decreasing, and high when the distance is increasing.

Considering both the Doppler effect and the indicator lag, the indicated distance is:

$$I = k \left[ \frac{2D}{c}(f_2 - f_1) f_m - \frac{2V}{c}(f_2 - f_1) f_m t_L + \frac{2V}{c} f_0 \right]$$

By making $$\frac{f_0}{(f_2 - f_1) f_m} = t_L$$

the last two terms cancel out and $$I = k \frac{2D}{c}(f_2 - f_1) f_m$$

substantially independently of the rate of change $V$ of distance.

The quantities $t_L$ and $$\frac{f_0}{(f_2-f_1)f_m}$$

may be made equal by choosing suitable values for the mean transmitter frequency $f_0$, the modulation frequency $f_m$, and the modulation sweep band width $f_2-f_1$. Since some of the above factors are ordinarily determined in accordance with other considerations, it may be impractical in some cases to make $$\frac{f_0}{(f_2-f_1)f_m}$$

as small as $t_L$. In this event the magnitude of $t_L$ may be increased by any of various well known means as by increasing the electrical or mechanical damping of the meter 17 or providing a time delay network in the connections between the counter circuit 15 and the meter 17.

The invention has been described as an improved distance measuring system of the frequency modulation type, wherein the effects of lag in the response of the indicator system are compensated by utilizing the Doppler effect. The frequency of the transmitter is varied in sawtooth fashion, increasing at a constant rate and decreasing substantially instantaneously at a much higher rate. This causes the beat frequency to be outside the pass band of the receiver except when both the direct and reflected signals are increasing in frequency, and the Doppler shift in the received frequency is such as to cause anticipation of the true distance indication. The Doppler anticipation and the indicator lag are made equal to provide true indication of distance independently of the rate of change of distance.

We claim as our invention:

1. A distance measuring system including means for transmitting a high-frequency signal to an object whose distance is to be measured, means for varying cyclically the frequency of operation of said transmitter between two values $f_1$ and $f_2$ as a sawtooth function of time at a rate $f_m$, with the periods of increase of frequency much longer than the periods of decrease of frequency, means adjacent said transmitting means for receiving said signal as transmitted and after reflection by said object, and responsive thereto to provide a beat signal only during increase in frequency of said signal both as transmitted and after reflection, a frequency responsive indicator having a time lag $t_L$, and means for applying said beat signal to said indicator, wherein $$t_L = 2\frac{f_2-f_1}{f_2+f_1}f_m$$

2. In a radio distance measuring system of the frequency modulation type including transmitter means, frequency modulator means connected to said transmitter, receiver means, and beat frequency responsive indicator means connected to said receiver means, wherein said indicator means has a characteristic time lag $t_L$ in its response to changes in the frequency of the output of said receiver means, the method of compensating said time lag including the steps of adjusting the mean frequency of operation of said transmitter to a frequency $f_0$, and cyclically and alternately increasing the frequency of operation of said transmitter linearly with respect to time through a frequency range $f_2-f_1$ about said mean frequency $f_0$ at a rate of $f_m(f_2-f_1)$ cycles per second per second and decreasing said frequency of operation through said range $f_2-f_1$ at a much higher rate, where $$\frac{f_m(f_2-f_1)}{f_0}=t_L$$

3. A distance measuring system including a transmitter, a receiver near said transmitter and responsive to signals produced by said transmitter and reflected by an object whose distance is to be measured to produce a beat voltage output of a frequency equal to the instantaneous difference in frequency between said signals as transmitted and as received after reflection by said object, said receiver having an upper limit $f_0$ of beat frequency response, beat frequency responsive indicator means connected to said receiver and having a characteristic time lag $t_L$ in its response to changes in said beat frequency, and means for varying the frequency of operation of said transmitter cyclically and alternately about a mean value $f_0$ from one value $f_1$ to a higher value $f_2$ at a rate of change of frequency $(f_2-f_1)f_m$, and from said higher value $f_2$ to said lower value $f_1$ at a much higher rate of change of frequency $(f_2-f_1)f_x$, wherein $$\frac{(f_2-f_1)f_m}{f_0}=t_L$$

and $$f_x(f_2-f_1)\frac{2D}{c}>f_\bullet$$

wherein D is the maximum distance required to be measured, and c is the velocity of radiation propagation.

RAY G. SHANKWEILER.
DANIEL BLITZ.

REFERENCES CITED

The following references are of record in the file of this patent:

UNITED STATES PATENTS

| Number | Name | Date |
|---|---|---|
| 2,261,272 | Newhouse | Nov. 4, 1941 |
| 2,303,214 | Labin et al. | Nov. 24, 1942 |